United States Patent
Cipolla et al.

[19]

[11] Patent Number: 5,999,745
[45] Date of Patent: Dec. 7, 1999

[54] ONE-TIME-USE CAMERA WITH ANTI-BACKUP MECHANISM TO PREVENT REVERSE UNWINDING ROTATION OF FILM WINDER

[75] Inventors: David Cipolla, Pittsford; Mark A. Lamphron, Rochester, both of N.Y.

[73] Assignee: Eastman Kodak Company, Rochester, N.Y.

[21] Appl. No.: 09/232,017

[22] Filed: Jan. 14, 1999

[51] Int. Cl.$^6$ .............................. G03B 1/00; G03B 17/02
[52] U.S. Cl. .................. 396/6; 396/396; 396/411
[58] Field of Search ................. 396/6, 395, 396, 396/411

[56] References Cited

U.S. PATENT DOCUMENTS

| | | | |
|---|---|---|---|
| 3,736,015 | 5/1973 | Dierks et al. | 396/411 |
| 5,323,197 | 6/1994 | Alligood | 396/411 |
| 5,512,970 | 4/1996 | Kamoda et al. | 396/411 |
| 5,576,790 | 11/1996 | Lamphron et al. | 396/396 |
| 5,765,065 | 6/1998 | Yoshida et al. | 396/396 |
| 5,794,089 | 8/1998 | Dussinger et al. | 396/348 |

*Primary Examiner*—Eddie C. Lee
*Attorney, Agent, or Firm*—Roger A. Fields

[57] ABSTRACT

A camera comprising a film winding thumbwheel supported for rotation in a film winding direction and an opposite film unwinding direction, an anti-backup wheel supported for rotation in engagement with the thumbwheel, and an arresting device for preventing rotation of the anti-backup wheel in order to prevent rotation of the thumbwheel in the film unwinding direction, is characterized in that the arresting device is a stop engageable with the anti-backup wheel to prevent rotation of the anti-backup wheel and disengageable from the anti-backup wheel to permit rotation of the anti-backup wheel, and the anti-backup wheel is supported to be moved out of position spaced from the stop and into engagement with the stop, without becoming disengaged from the thumbwheel, when the thumbwheel is attempted to be rotated in the film unwinding direction.

8 Claims, 5 Drawing Sheets

ONE-TIME-USE CAMERA WITH ANTI-BACKUP MECHANISM TO PREVENT REVERSE UNWINDING ROTATION OF FILM WINDER

FIELD OF THE INVENTION

The invention relates generally to the field of photography, and in particular to cameras. More specifically, the invention relates to a one-time-use camera with an anti-backup mechanism for preventing reverse unwinding rotation of a film winding thumbwheel.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a film take-up chamber, an unexposed film roll prewound from the film cartridge and onto a film spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge and advances an unexposed section of the filmstrip to a rear backframe (exposure) opening in the main body part. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the film take-up chamber. Then, he removes the exposed filmstrip from the film cartridge to develop the negatives and make prints for the customer. At least some of the used camera parts may be recycled, i.e. reused, to remanufacture the camera.

PROBLEM

Typically, a resilient anti-backup pawl for the film winding thumbwheel engages successive peripheral integral teeth of the thumbwheel to prevent reverse rotation of the thumbwheel in a film unwinding direction when the shutter release button is manually depressed and the metering lever is pivoted out of engagement with the thumbwheel.

The problem is that the disengagement and re-engagement of the resilient pawl with the peripheral teeth produces a periodic ratcheting sound as the thumbwheel is rotated in the film winding direction.

An attempt to provide an anti-backup device that is quieter than an anti-backup pawl is disclosed in commonly assigned U.S. Pat. No. 5,576,790 issued Nov. 19, 1996. In the patent, the toothed periphery of the thumbwheel engages a similar-pitch toothed periphery of an anti-backup wheel. The engagement of the thumbwheel and the anti-backup wheel at their toothed peripheries does not produce a periodic ratcheting sound when the thumbwheel is rotated in the film winding direction. A helical coil spring is coiled about a coaxial shank of the anti-backup wheel. When the thumbwheel is rotated in the film winding direction the anti-backup wheel is rotated to loosen or relax the coil spring about the shank, but when the thumbwheel is rotated in the film unwinding direction the coil spring immediately tightens or constricts about the shank to brake the thumbwheel.

SUMMARY OF THE INVENTION

According to one aspect of the invention, a camera comprising a film winding thumbwheel supported for rotation in a film winding direction and an opposite film unwinding direction, an anti-backup wheel supported for rotation in engagement with the thumbwheel, and an arresting device for preventing rotation of the anti-backup wheel in order to prevent rotation of the thumbwheel in the film unwinding direction, is characterized in that:

the arresting device is a stop engageable with the anti-backup wheel to prevent rotation of the anti-backup wheel and disengageable from the anti-backup wheel to permit rotation of the anti-backup wheel; and the anti-backup wheel is supported to be moved out of position spaced from the stop and into engagement with the stop, without becoming disengaged from the thumbwheel, when the thumbwheel is attempted to be rotated in the film unwinding direction.

According to another aspect of the invention, a method of operating a film winding thumbwheel to allow its rotation in a film winding direction and to prevent its rotation in an opposite film unwinding direction in a camera, comprises the steps:

rotating the thumbwheel in engagement with an anti-backup wheel in the film winding direction to proportionally rotate the anti-backup wheel; and rotating the thumbwheel in engagement with the anti-backup wheel in the film unwinding direction to move the anti-backup wheel out of position spaced from a stop and into engagement with the stop, without the anti-backup wheel becoming disengaged from the thumbwheel, in order to prevent rotation of the anti-backup wheel to thus prevent further rotation of the thumbwheel.

DETAILED DESCRIPTION OF THE INVENTION

Figure 1:
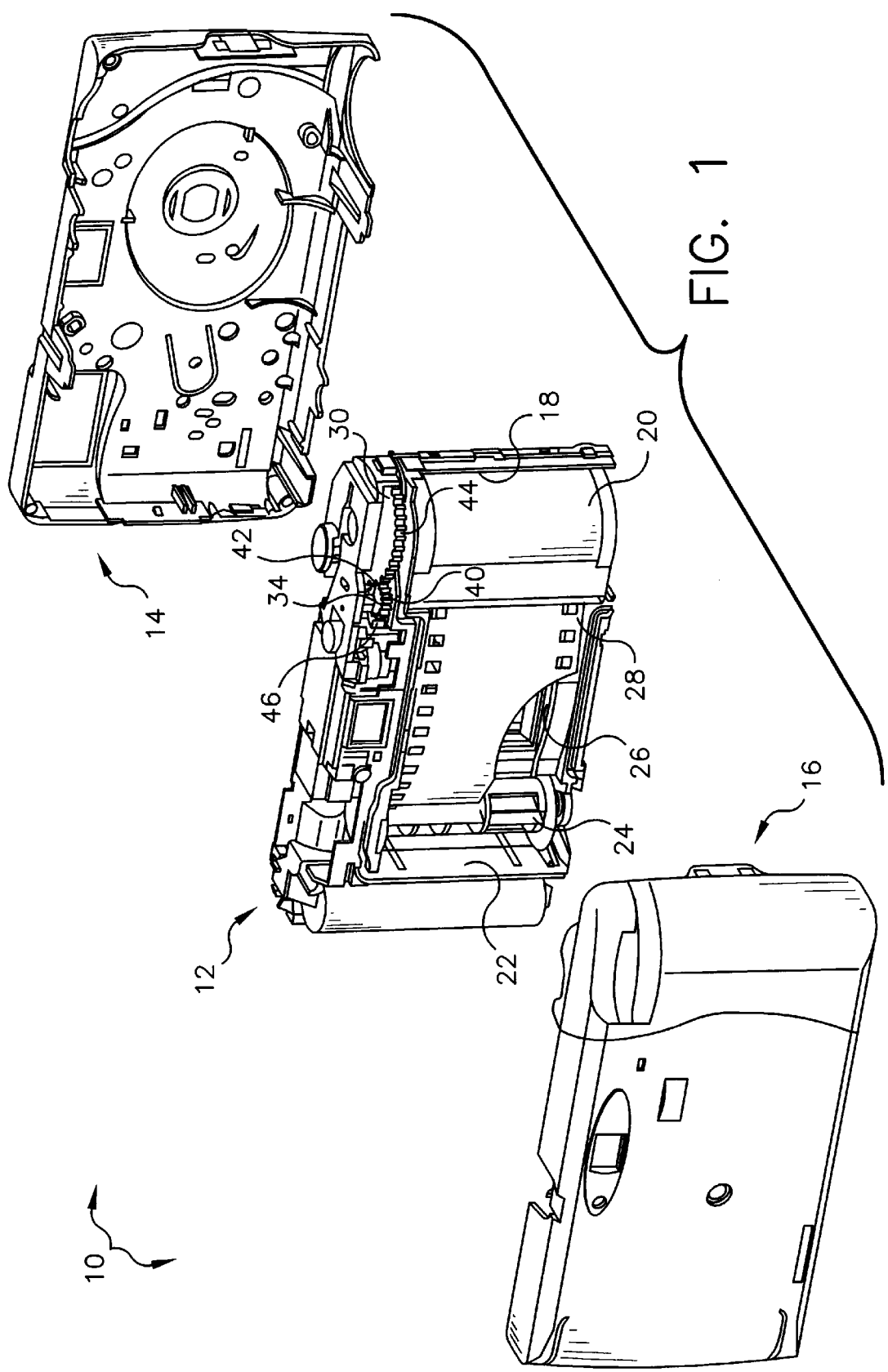
FIG. 1 is an exploded rear perspective view of a one-time-use camera which is a preferred embodiment of the invention.
Figure 2:
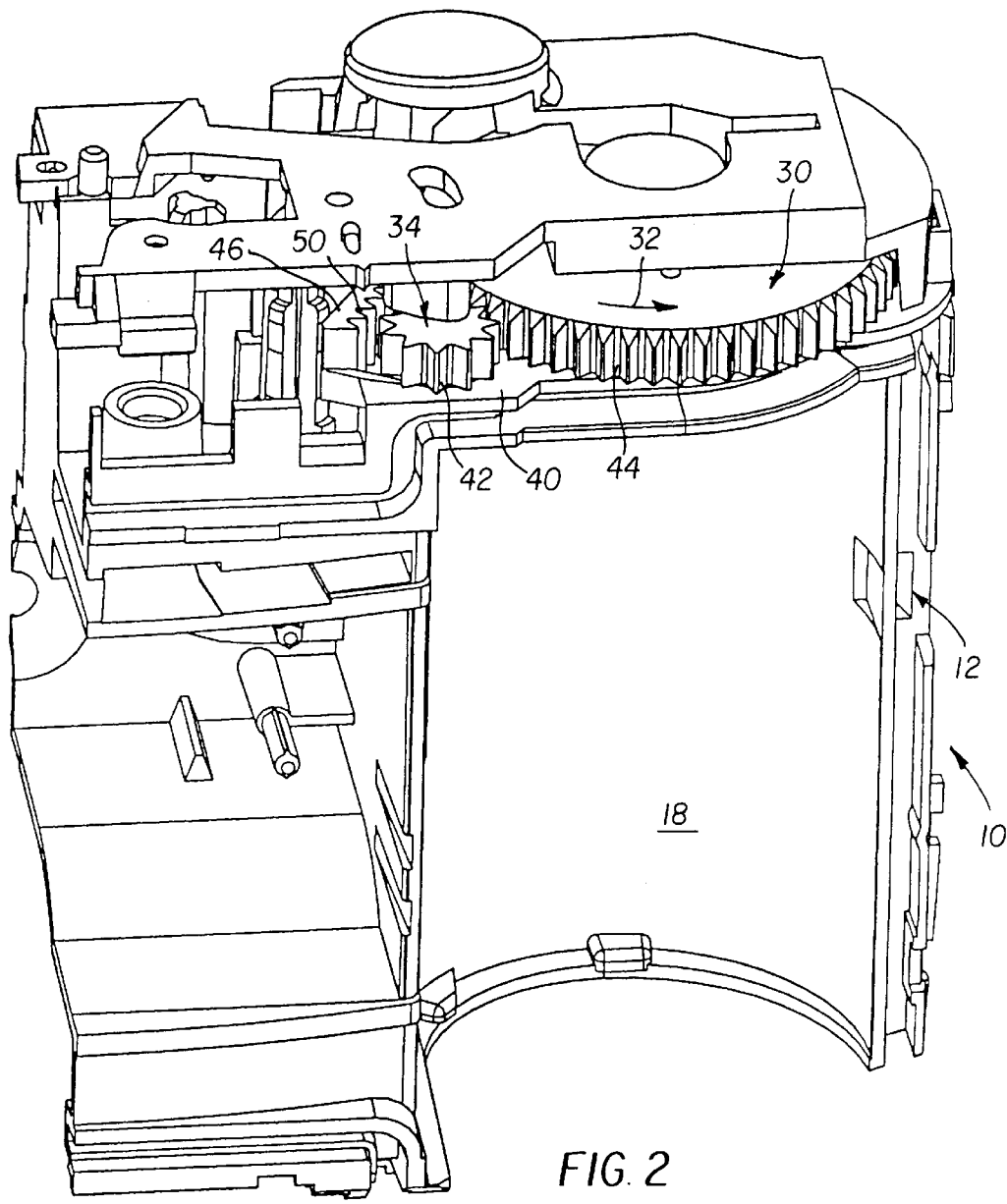
FIG. 2 is a rear perspective view of a film winding thumbwheel and an anti-backup mechanism to prevent reverse unwinding rotation of the thumbwheel in the camera, showing the anti-backup mechanism in an inoperative mode.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a one-time-use camera 10 in which an opaque plastic main body part 12 is housed in a pair of opaque plastic front and rear cover parts 14 and 16. The front and rear cover parts 14 and 16 are connected to one another and to the main body part 12 via known hook-in-hole connections.

The main body part 12 has a rearwardly open film take-up chamber 18 which contains a conventional film cartridge 20, a rearwardly open film supply chamber 22 which contains a film spool 24 for an unexposed film roll (not shown), and a backframe opening 26 located between the film take-up chamber and the film supply chamber for exposing successive imaging sections of a filmstrip 28. See FIGS. 1, 2 and 4.

A known film winding thumbwheel 30 is rotatably supported on the main body part 12 and has a depending coaxial stem (not shown) received in an end opening of a film spool (not shown) inside the film cartridge 20, to rotationally engage the film spool. Manual winding rotation of the thumbwheel 30 in a film winding direction 32 (counter-clockwise in FIGS. 1–5) similarly rotates the film spool inside the film cartridge 20 to wind each exposed section of the filmstrip 28 onto the film spool and to advance an unexposed section of the filmstrip to the backframe opening 26.

An anti-backup wheel 34 has a depending coaxial hub projection 36 that is located in a slot 38 formed in a support piece 40 for the anti-backup wheel. See FIGS. 3 and 5. The hub projection 36 in the slot 38 serves to support the anti-backup wheel 34 for rotation and for translation. The anti-backup wheel 34 and the thumbwheel 30 have respective peripheral teeth 42 and 44 that successively engage when the thumbwheel is rotated. A stop 46 fixed at one end 48 of the slot 38 has a series of teeth 50.

Operation

Figure 3:
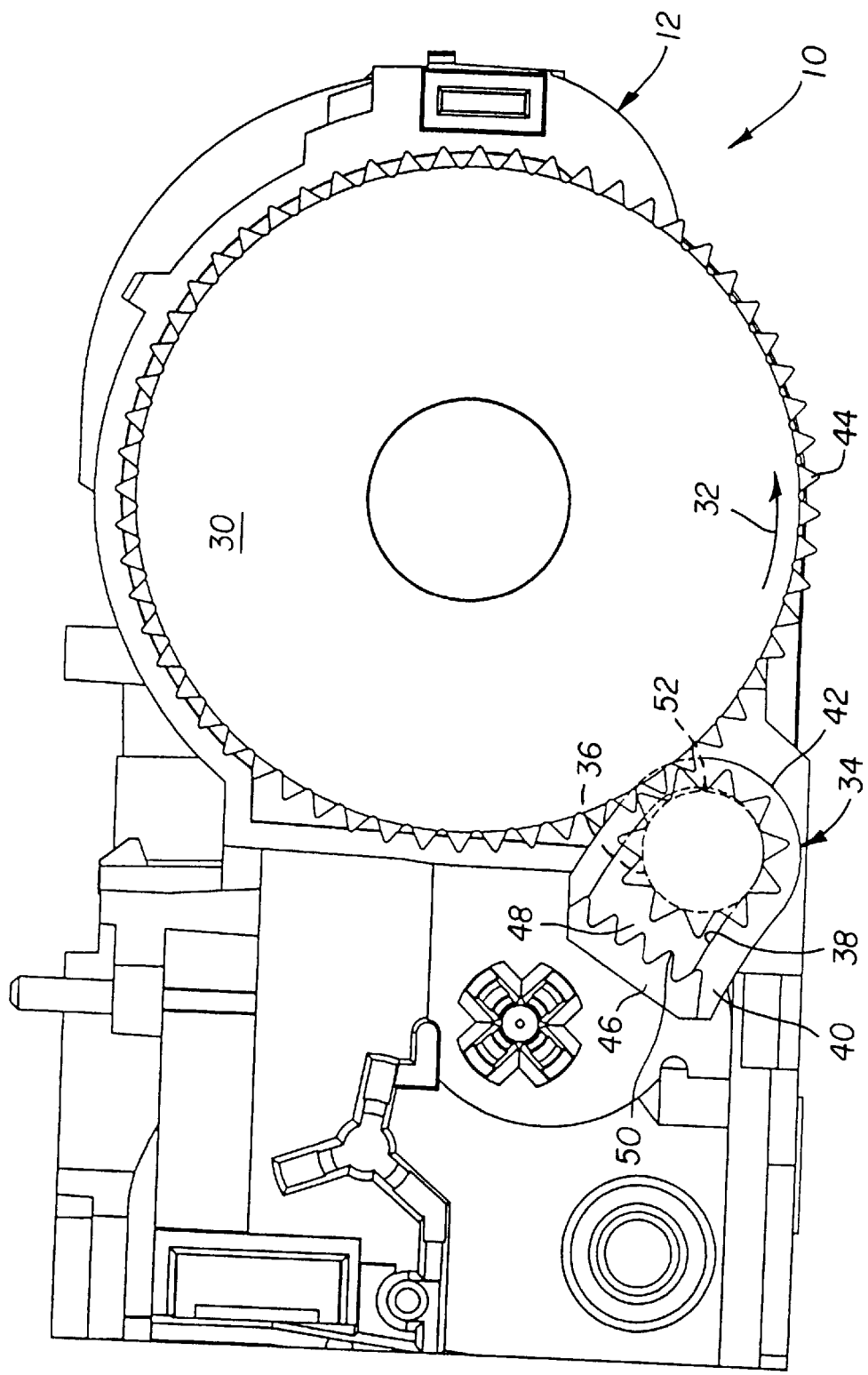
FIG. 3 is a top plan view of the film winding thumbwheel and the anti-backup mechanism as shown in FIG. 2.
Figure 4:
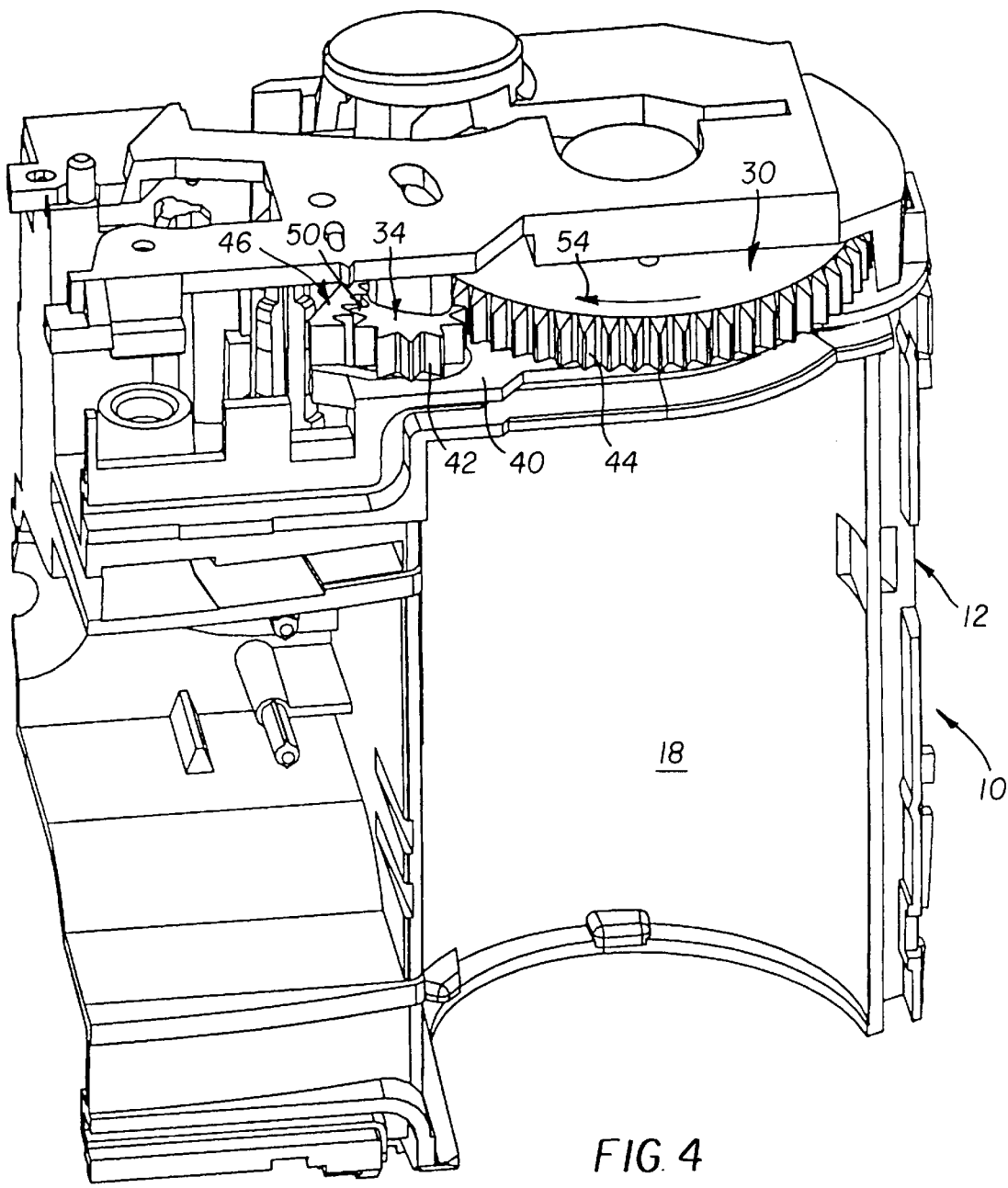
FIG. 4 is a rear perspective view of the film winding thumbwheel and the anti-backup mechanism, showing the anti-backup mechanism in an operative mode.
Figure 5:
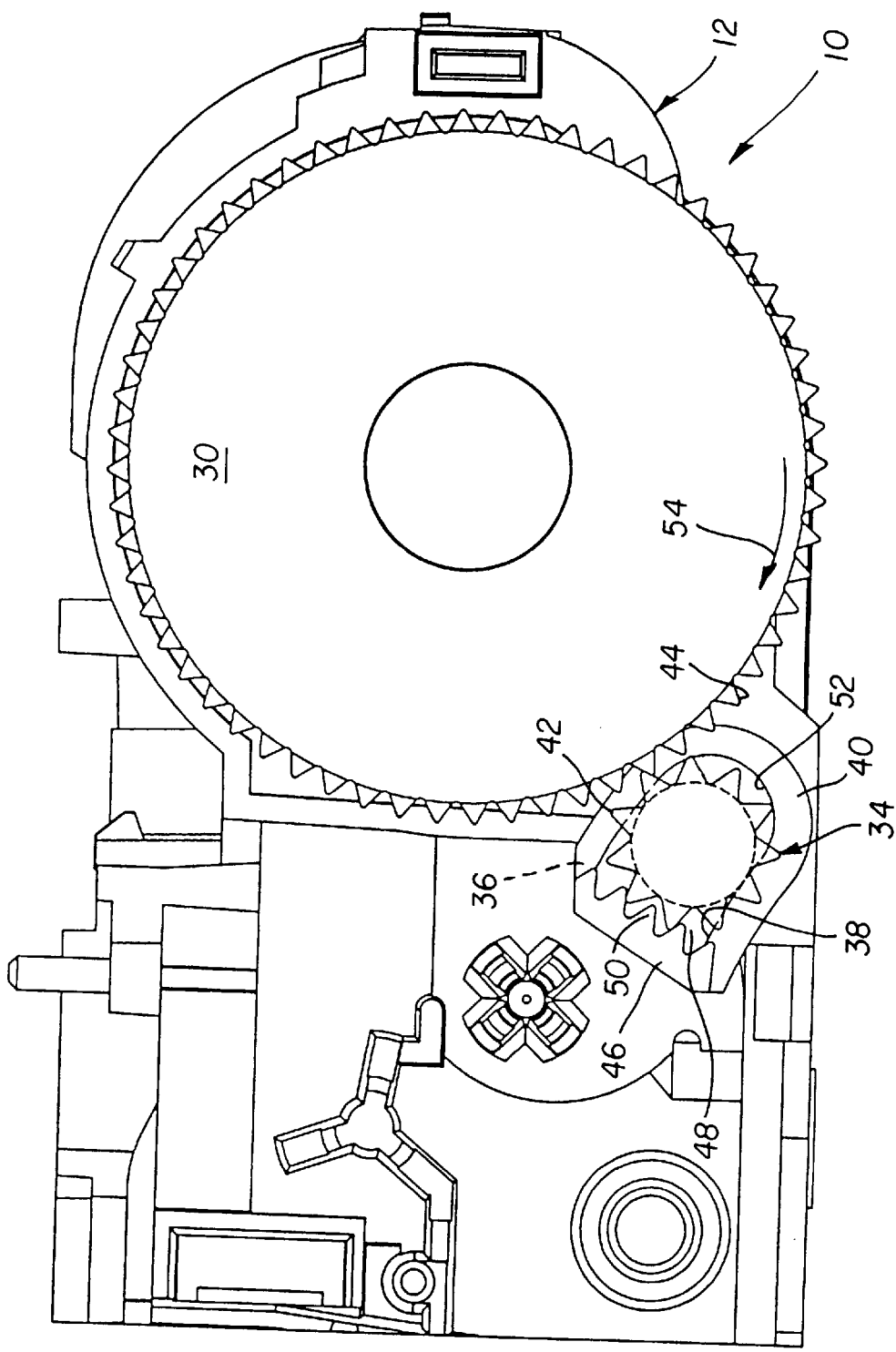
FIG. 5 is a top plan view of the film winding thumbwheel and the anti-backup mechanism as shown in FIG. 4.

When one rotates the thumbwheel 30 in the film winding direction 32, its peripheral teeth 44 successively mesh with the peripheral teeth 42 of the anti-backup wheel 34 to urge the hub projection 36 of the anti-backup wheel against another end 52 of the slot 38 and to rotate the anti-backup wheel clockwise in FIG. 3. The tooth-to-tooth engagement of the thumbwheel 30 and the anti-backup wheel 34 does not produce a periodic ratcheting sound when the thumbwheel is rotated in the film winding direction 32.

When one attempts to rotate, i.e. initially rotates, the thumbwheel 30 in a film unwinding direction 54 (clockwise in FIG. 5), its peripheral teeth 44 mesh with the peripheral teeth 42 of the anti-backup wheel 34 to translate the hub projection 36 of the anti-backup wheel from the end 52 of the slot 38 towards the end 48 of the slot. This causes several of the peripheral teeth 42 of the anti-backup wheel 34 to engage with several of the teeth 50 of the stop 46. Thus, the anti-backup wheel 34 is arrested to prevent further rotation of the thumbwheel 30 in the film unwinding direction 54.

When one rotates the thumbwheel 30 in the film winding direction 32, its peripheral teeth 44 successively mesh with the peripheral teeth 42 of the anti-backup wheel 34 to urge the hub projection 36 of the anti-backup wheel from the end 48 of the slot 38 to against the end 52 of the slot to separate the peripheral teeth of the anti-backup wheel from the teeth 50 of the stop 46 and to rotate the anti-backup wheel clockwise in FIG. 3. Thus, the thumbwheel 30 can continue to be rotated in the film winding direction 32.

The invention has been described with reference to a preferred embodiment. However, it will be appreciated that variations and modifications can be effected by a person of ordinary skill in the art without departing from the scope of the invention.

Parts List 10. one-time-use camera
12. main body part
14. front cover part
16. rear cover part
18. film take-up chamber
20. film cartridge
22. film supply chamber
24. film spool
26. backframe opening
28. filmstrip
30. film winding thumbwheel
32. film winding direction
34. anti-backup wheel
36. hub projection
38. slot
40. support piece
42. teeth
44. teeth
46. stop
48. end
50. teeth
52. end
54. film unwinding direction

What is claimed is:

1. A camera comprising a film winding thumbwheel supported for rotation in a film winding direction and an opposite film unwinding direction, an anti-backup wheel supported for rotation in engagement with said thumbwheel, and an arresting device for preventing rotation of said anti-backup wheel in order to prevent rotation of said thumbwheel in the film unwinding direction, is characterized in that:

said arresting device is a stop engageable with said anti-backup wheel to prevent rotation of said anti-backup wheel and disengageable from said anti-backup wheel to permit rotation of said anti-backup wheel; and said anti-backup wheel is supported to be moved out of position spaced from said stop and into engagement with said stop, without becoming disengaged from said thumbwheel, when said thumbwheel is attempted to be rotated in the film unwinding direction.

2. A camera as recited in claim 1, wherein said anti-backup wheel is supported for translation to be moved into engagement with said stop.

3. A camera as recited in claim 1, wherein said anti-backup wheel is supported to be moved out of engagement with said stop and into position spaced from said stop, without becoming disengaged from said thumbwheel, when said thumbwheel is rotated in the film winding direction.

4. A camera as recited in claim 3, wherein said anti-backup wheel is supported for translation to be moved out of engagement with said stop.

5. A camera as recited in claim 1, wherein said thumbwheel and said anti-backup wheel have respective teeth that successively engage when said thumbwheel is rotated, and said stop has at least one tooth for engaging any one of said teeth of said anti-backup wheel to prevent rotation of said anti-backup wheel.

6. A camera as recited in claim 5, wherein said anti-backup wheel is supported for translation to move any one of its teeth into engagement with said tooth of said stop.

7. A camera as recited in claim 5, wherein said anti-backup wheel has a coaxial hub projection, and a support piece for said anti-backup wheel has a slot in which said hub projection is located to support said anti-backup wheel for rotation in engagement with said thumbwheel and for translation to move any one of said teeth of said anti-backup wheel into engagement with said tooth of said stop.

8. A method of operating a film winding thumbwheel to allow its rotation in a film winding direction and to prevent its rotation in an opposite film unwinding direction in a camera, said method comprising the steps:

rotating the thumbwheel in engagement with an anti-backup wheel in the film winding direction to proportionally rotate the anti-backup wheel; and rotating the thumbwheel in engagement with the anti-backup wheel in the film unwinding direction to move the anti-backup wheel out of position spaced from a stop and into engagement with the stop, without the anti-backup wheel becoming disengaged from the thumbwheel, in order to prevent rotation of the anti-backup wheel to thus prevent further rotation of the thumbwheel.

\* \* \* \* \*